April 24, 1962  F. SCHÄDLICH  3,030,839
TORQUE TRANSMITTING AND IMPACTING APPARATUS
Filed Dec. 8, 1960
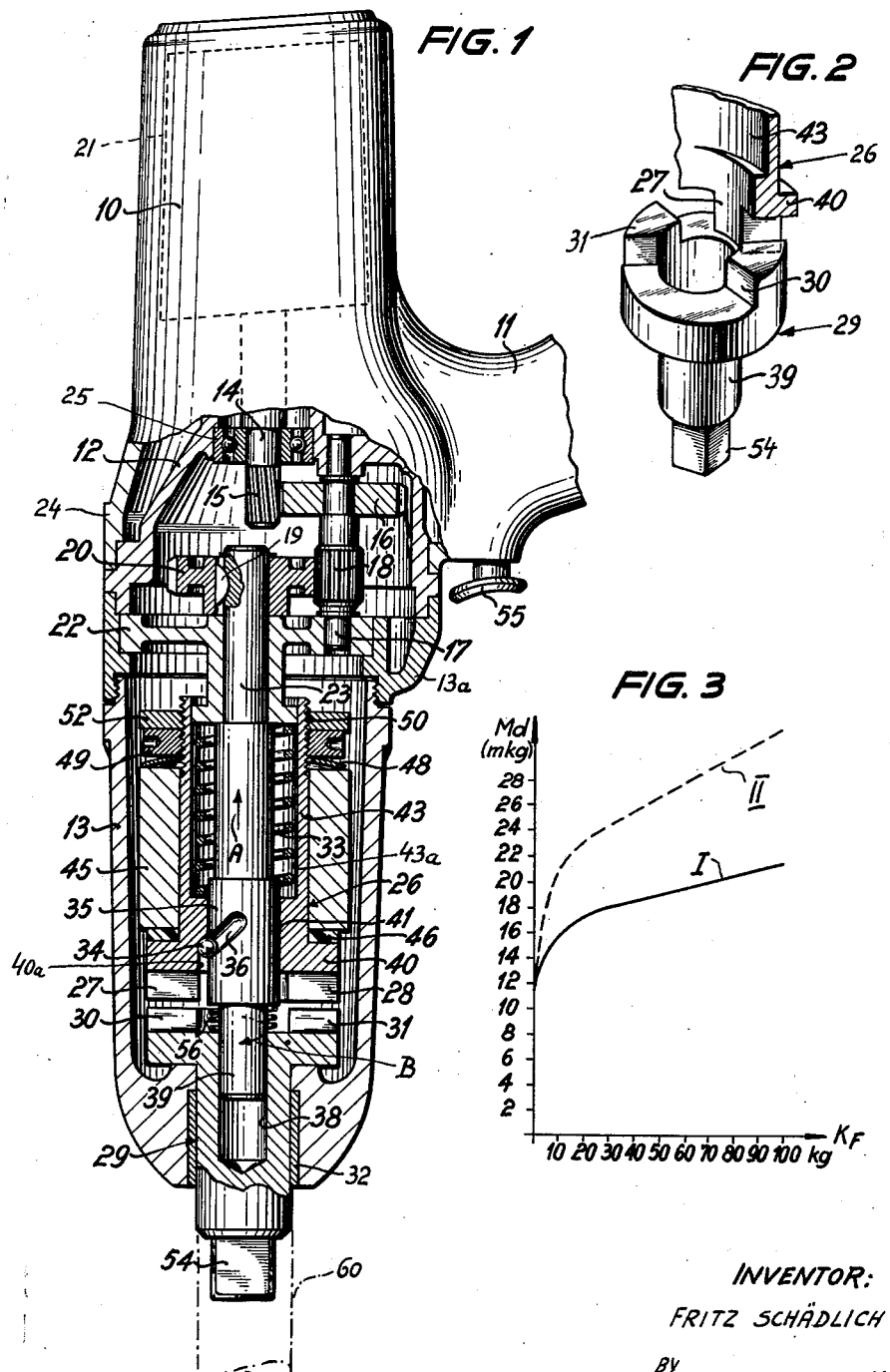
INVENTOR:
FRITZ SCHÄDLICH
BY Michael S. Striker
his ATTORNEY United States Patent Office 3,030,839
Patented Apr. 24, 1962

3,030,839
TORQUE TRANSMITTING AND IMPACTING
APPARATUS
Fritz Schädlich, Stuttgart, Germany, assignor to Robert
Bosch G.m.b.H., Stuttgart, Germany
Filed Dec. 8, 1960, Ser. No. 74,672
Claims priority, application Germany Dec. 11, 1959
12 Claims. (Cl. 81—52.3)

The present invention relates to torque transmitting and impacting apparatus of the type which may be utilized as portable motor-driven screwdrivers or the like.

It is already known to provide a portable motor-driven screwdriver with a mass which applies a substantial torque to a tool-supporting driven member so that the latter may transmit such torque to a screw, to a nut, or to another threaded connecting member. A serious drawback of such devices is that they often subject the threaded member to excessive stresses which are beyond the elastic limit, unless the motor is arrested in time. This is observable when say a screw must be driven home into two or more rigid bodies so that, once the rigid bodies come into actual abutment with each other, the screw will yield in response to further rotation of the tool-supporting member and will be deformed beyond its elastic limit. On the other hand, when a screw is utilized for connecting two or more flexible bodies, such as a package of metallic sheets, the torque transmitted by a conventional motor-driven screwdriver is often insufficient to insure a satisfactory connection so that the screw must ultimately be driven home by hand.

An important object of the present invention is to provide a torque transmitting and impacting apparatus which is constructed and assembled in such a way that the torque transmitted to its tool-supporting member may be varied within a very broad range whereby the apparatus may be used in connection with very weak as well as with very strong threaded members.

Another object of the invention is to provide a torque transmitting apparatus of the just outlined characteristics which is particularly useful as a portable screwdriver and wherein the tool-supporting driven member is disconnected from the motor before the stresses transmitted to a threaded member exceed the latter's elastic limit.

A further object of the invention is to provide a portable electric screwdriver which is particularly suited for driving home screws into strongly flexible metallic bodies.

An additional object of my invention is to provide a screwdriver of the above described type wherein the torque transmitted to a threaded member may be increased by at least 100 percent.

A concomitant object of the invention is to provide a portable electric apparatus for applying torque to screws, bolts, nuts and like threaded members which is capable of subjecting such threaded members to repeated rotation-producing impacts of adjustable magnitude.

Still another object of the invention is to provide a portable electric apparatus of the above outlined characteristics which is reliable in use, which may be assembled into a lightweight structure, wherein the tool supported by the driven member may be readily and rapidly exchanged to adapt the apparatus for a different use, and which may be conveniently adjusted with a view to prevent transmission of excessive stresses to a threaded member.

With the above objects in view, the invention resides in the provision of a torque transmitting and impacting apparatus which comprises essentially a motor-driven spindle, a driving member which is connected to and is longitudinally movable with respect to the spindle, a driven member which carries a screwdriver or another tool for imparting torque to a threaded member, a coupling for releasably connecting the driving member with the driven member so that the latter may transmit torque to the tool, and resilient means for permanently biasing the driving member into engagement with the driven member. The arrangement is such that, if the resistance offered by the driven member to rotation by the driving member increases beyond a predetermined magnitude, i.e. when say a screw is driven home to such an extent that a substantial force is necessary for imparting further rotation thereto, the driving member is caused to move away from the driven member against the bias of the aforementioned resilient means so that the connection between the driving and driven members is terminated and the driving member is free to continue its rotary movement with respect to the now stationary driven member. However, since the resilient means always biases the driving member toward the driven member, the coupling becomes operative again and transmits a sudden impact to the driven member so that the latter transmits a rotary impulse to the screw. The procedure is repeated until the operator notes that repeated impacts of the driven member cause no additional angular displacement of the screw, i.e. that the screw is driven home to such an extent as to require a torque greater than that produced by the sudden impacts of the driven member if any additional turning of the screw is desired.

In accordance with an important feature of my invention, the driving member is frictionally coupled with a preferably annular sleeve-like flywheel mass so that the mass increases the inertia of the driving member when the latter transmits sudden rotary impulses to the driven member. The frictional force between the driving member and the flywheel mass is adjustable so that the operator may select a permissible maximum torque such as will not subject the threaded member to excessive stresses. Furthermore, the flywheel mass may be exchanged with a view to alter the inertia moment of the flywheel mass with respect to the inertia moment of the driving member.

The novel features which are considered as characteristic for the invention are set forth in particular in the appended claims. The invention itself, however, both as to its construction and its method of operation, togtther with additional objects and advantages thereof, will be best understood from the following detailed description of a specific embodiment when read in connection with the accompanying drawing, in which:

FIG. 1 is a partly elevational and partly sectional view of a portable motor-driven screwdriver embodying my invention;

FIG. 2 is a fragmentary perspective view of a claw coupling assembly forming part of the screwdriver; and FIG. 3 is a diagram showing the relationship of resultant torque to friction between the driving member and the flywheel mass.

Referring now in greater detail to the drawing, and first to FIG. 1, there is shown a rotary torque transmitting and impacting apparatus in the form of a portable electric motor-driven screwdriver which comprises a housing 10, preferably consisting of light metal and including a laterally extending handle 11 which is grasped by the hand of an operator when the apparatus is in actual use. The housing 10 accommodates an electric motor 21 and its open end portion 24 receives a cupped cover 12 which serves as a support for the two-piece casing or shell 13, the latter surrounding an annular driving member in the form of a flywheel mass 26, and constituting a bearing for the tool-supporting driven member in the form of an anvil 29.

The shaft 14 of the electric motor 21 rotates in an antifriction bearing 25 which is mounted in the cupped cover 12, and its free end is provided with a helical spur gear 15 which meshes with a larger helical spur gear 16 on a countershaft 17, the latter having its opposite ends journaled in the cover 12 and in a bearing plate 22 which is inserted into the annular rear portion 13a of the composite shell 13. The countershaft 17 is formed with a spur gear 18 which meshes with a larger spur gear 20 keyed at 19 onto one end of a driving spindle 23, the latter being coaxial with the shell 13 and rotatably mounted in the bearing plate 22 as well as in a blind bore 38 of the driven member 29. The gear 20 is preferably keyed to that end of the spindle 23 which projects beyond the bearing plate 22 in a direction toward the motor 21 and is directly adjacent to the bearing plate 22. It will be noted that the train of gears 15, 16 and 18, 20 constitutes a step-down transmission so that the spindle 23 is driven at a substantially reduced speed such as is necessary for turning a screwdriver 60 or another impact receiving tool which is preferably releasably secured to the non-circular outwardly and forwardly projecting end 54 of the driven member 29. A portion of the driven member 29 is rotatably received in a bronze bearing sleeve 32 provided in the foremost end of the shell 13.

The interior of the shell 13 accommodates my novel striking or impact-producing arrangement which is coaxial with the spindle 23 and which, in addition to the aforementioned driving member 26, comprises a claw coupling assembly 27—28, 30—31, a resilient element in the form of a helical expansion spring 33 which surrounds an intermediate portion of the spindle 23 and is received in a coaxial bore 43a provided in a cylindrical extension 43 of the driving member 26, and a ball-and-groove coupling 34, 36 which operates between the driving member 26 and the boss 35 of the spindle 23 to permit longitudinal movements of the driving member along the spindle. The sector-shaped coupling elements or claws 27, 28 and 31, 31 are respectively provided on the adjacent end faces of the members 26, 29 and come into operative engagement with each other when the ball 34 rolls in its helical groove 36 in a direction toward the driven member 29. It will be noted that a portion of the ball 34 is received in an axially parallel recess 40a provided in the cylindrical inner wall of the bore formed in the driving member 26, and more particularly in the latter's coaxial collar 40 which actually carries the segmental claws 27, 28. The inner wall 41 of the driving member 26 is finished with great precision and is rotatably and axially shiftably guided along the equally finished boss 35 of the spindle 23. The forward end of this spindle 23 constitutes a trunnion 39 which is rotatably received in the aforementioned blind bore 38 of the coaxial driven member 29.

The cylindrical extension 43 of the annular driving member 26 carries a coaxial second flywheel mass 45 which assumes the shape of an annulus and is mounted between a friction producing washer 46 and a dished spring 48. The washer 46 consists of a synthetic plastic material, e.g. nylon (trademark), and is disposed between the forward end face of the flywheel mass 45 and the adjacent rear end face of the collar 40. The spring 48 operates between the rear end face of the mass 45 and an adjusting nut 49 which is screwed onto the externally threaded rear end portion 50 of the extension 43. The adjusting nut 49 is held in a fixed position by a lock nut 52. The purpose of the plastic washer 46 is to frictionally connect the driving member 26 and the flywheel mass 45 so that the latter is releasably connected with and is adapted to rotate with the driving member and with the spindle 23 when the motor 21 is started to thereby increase the inertia of the driving member. The frictional force between the washer 46 and the mass 45 is produced by the dished spring 48 which is maintained in deformed condition by the adjusting nut 49, i.e. any adjustments in the angular position of the nut 49 with respect to the extension 43 will change the force of the spring 48 and hence the friction between the flywheel mass 45 and the washer 46 on the one hand, as well as between the washer 46 and the collar 40 on the other hand.

When the torque transmitting apparatus is put to actual use, the operator depresses a switch 55 at the underside of the handle 11 to start the motor 21 and to thereby rotate the spindle 23. The operator then introduces the end of the screwdriver 60 into the slot of a screw (not shown) and applies a pressure to the handle 11 in a direction to move the driven member 29 axially toward the driving member 26 by overcoming the bias of a comparatively weak helical spring 56 which is inserted between the rear end face of the driven member 29 and the front end face of the boss 35. Such axial displacement of the driven member 29 moves the claws 30, 31 into engagement with the claws 27, 28 so that the driven member 29 begins to rotate with the driving member 26 and drives home the screw which is assumed to be engaged by the end of the screwdriver 60. The bias of the helical spring 33 is strong enough to maintain the driving member 26 in the coupling position of FIG. 1 by operating between that portion of the fixed bearing plate 22 which extends into the bore 43a and the bottom end wall of this bore. As long as the resistance of this screw is insufficient to overcome the bias of the spring 33, the driving member 26 is coupled with and rotates at a constant speed with the driven member 29 to rapidly advance the screw into one or more layers of metallic or other material. Thus, as long as the resistance of the screw and hence of the driven member 29 cannot overcome the expanding force of the spring 33, no impacting or striking action will develop because the torque transmitted by the claws 27, 28 is sufficient to drive the screw home.

However, as soon as the resistance of the screw to further rotation of the driven member 29 reaches a predetermined magnitude, i.e. when the spring 33 cannot retain the driving member 26 in engagement with driven member 29, the driving member 26 begins to lag behind the spindle 23 by moving axially in the direction of the arrow A while the spindle continues to rotate in the direction indicated by the arrow B. The second flywheel mass 45 follows the driving member 26 while the latter performs a composite axial and angular movement with respect to the spindle 23. This composite movement is determined by the pitch of the helical groove 36 in the boss 35. It will be readily understood that the length of the axial movement performed by the driving member 26 in the direction of the arrow A depends on the length and on the pitch of the groove 36 since the ball 34 will not permit any other displacements of the driving member with respect to the spindle 23. As the driving member 26 continues to advance in the direction of the arrow A, the claws 27, 28 move away and, at a certain stage, become completely separated from the complementary claws 30, 31. The claws 30, 31 cannot follow such axial movement of the claws 27, 28 because, once the spring 56 is fully compressed, the axial progress of the driven member 29 in the direction of the arrow A is arrested by the annular front end face of the boss 35 so that the driven member 29 is brought to a sudden halt as soon as the claws 27, 28 become disengaged from the claws 30, 30. The spring 33 is strongly compressed between the bearing plate 22 and the bottom wall of the bore 43a and, consequently, as soon as the claws 27, 28 are moved clear of the complementary claws 30, 31, this spring expands immediately and causes the ball 34 to travel toward the lower end of its groove 36, as viewed in FIG. 1, to thereby move the driving member 26 back into engagement with the driven member 29 and to produce a rotary impulse by sudden impact of claws 27, 28 against the complementary claws 30, 31.

Such impulse brings about an angular displacement of the screw engaged by the screwdriver 60 so that the screw is driven home with a force equal to the expanding force of the spring 33 plus the inertia of the composite flywheel mass 26, 45. Depending on the expanding force of the spring 33 and on the inertia of the mass 26, 45, the improved apparatus can generate a controlled striking force which is sufficient to drive home a screw even if the latter must penetrate a laminated structure consisting of differently curved and strongly flexible sheet metal plates or the like. The combined axial and angular acceleration of the driving member 26 is terminated when the claws 27, 28 reengage the complementary claws 30, 31 and when the resistance of the screw again causes a longitudinal displacement of the driving member 26 with respect to the spindle 23. The force of the impact during each reengagement of claws 27, 28 with the claws 30, 31 depends on the friction between the washer 46 on the one hand, and the mass 45 and the collar 40 on the other hand, i.e. on the momentary position of the adjusting nut 49 and on the bias of the spring 48. It will be readily understood that, if the deformation of the spring 48 is only slight, the friction between the washer 46 and the mass 45 is so small that the inertia moment of the revolving mass 45 cannot be transmitted to the claw coupling assembly 27—28, 30—31 because the mass 45 will slip with respect to the driving member so that the torque of the screwdriver 60 during each renewed impact of claws 27, 28 against the claws 30, 31 might be insufficient to bring about additional angular displacements of the screw. In such instances, the operator merely adjusts the angular position of the nut 49 to compress the spring 48 and to insure a stronger frictional engagement between the mass 45 and the washer 46. Thus, by utilizing a comparatively heavy mass 45, the improved apparatus may be adjusted to transmit a constant torque and sudden rotary impulses whose force may vary within a very wide range whereby the apparatus may be put to a number of different uses. It will be readily understood that the end of the tool 60 may assume any desired shape such as is necessary for driving home differently shaped screws, nuts or other threaded members.

The curve I plotted in the diagram of FIG. 3 illustrates the rise in driving torque $Md$ to which the driven member 29 is subjected in response to increasing force $K_F$ of the spring 48. When the force $K_F$ reaches 100 kg. the torque increases to about 21 mkg. because it is then assumed that the friction between the washer 46 and the components of the composite flywheel mass 26, 45 prevents any angular displacements between these parts. The curve I is illustrative of that situation when the moment of inertia of the driving member 26 equals or approximates the moment of inertia of the flywheel mass 45. The broken-like curve II indicates the changes in driving torque when the moment of inertia of the driving member 26 equals only one-half the moment of inertia of the flywheel mass 45. This situation is assumed to prevail in the apparatus of FIG. 1.

Without further analysis, the foregoing will so fully reveal the gist of the present invention that others can, by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A torque and impulse transmitting apparatus comprising, in combination, rotary spindle means; an annular driving member coaxially surrounding said spindle means; means longitudinally movably connecting said driving member for rotation with said spindle means; an annular flywheel mass coaxially surrounding said driving member; friction producing means for connecting said mass with said driving member so that the mass is adapted to rotate with and increases the inertia of said driving member; a tool-supporting driven member; means comprising at least one coupling element on said driving member and at least one complementary coupling element on said driven member; and resilient means for permanently biasing said driving member into a coupling position in which said coupling elements are in engagement with each other and said driven member rotates with said driving member, the arrangement being such that said coupling elements are disengaged from each other by longitudinal movement of said driving member with respect to said spindle means in response to a predetermined resistance offered by said driven member to rotation with said driving member, and that said coupling elements reengage each other under the bias of said resilient means to impart a sudden rotary impulse to said driven member.

2. A portable torque and impulse transmitting apparatus comprising, in combination, housing means comprising handgrip means; electric motor means mounted in said housing means; a casing connected with said housing means; a rotary spindle mounted in said casing; transmission means for drivingly connecting said motor means with said spindle; an annular driving member received in said casing and coaxially surrounding said spindle; first coupling means longitudinally movably connecting said driving member for rotation with said spindle; an annular flywheel mass coaxially surrounding said driving member; friction producing means for drivingly connecting said driving member with said flywheel mass; means for adjusting said friction producing means; a tool-supporting driven member coaxial with said spindle and rotatably mounted in said casing, said driven member adjacent to said driving member and having a portion projecting from said casing; second coupling means comprising at least one coupling element on said driving member and at least one complementary coupling element on said driven member; and resilient means provided in said casing for permanently biasing said driving member into a coupling position in which said coupling elements are in engagement with each other and said driven member rotates with said driving member, the arrangement being such that said coupling elements are disengaged from each other by longitudinal movement of said driving member with respect to said spindle in response to a predetermined resistance offered by said driven member to rotation with said driving member, and that said coupling elements reengage each other under the bias of said resilient means to impart a sudden rotary impulse to said driven member.

3. A portable torque and impulse transmitting apparatus comprising, in combination, housing means comprising handgrip means; electric motor means mounted in said housing means; a casing connected with said housing means; a rotary spindle mounted in said casing; transmission means for drivingly connecting said motor means with said spindle; an annular driving member received in said casing and coaxially surrounding said spindle, said driving member having an externally threaded portion and a collar; first coupling means longitudinally movably connecting said driving member for rotation with said spindle; an annular flywheel mass coaxially surrounding said driving member and having two end faces one of which is adjacent to said collar; a friction producing washer disposed between said one end face of said collar; spring means adjacent to the other end face of said flywheel mass; an adjusting nut meshing with the externally threaded portion of said driving member and engaging with said spring means whereby said flywheel mass is maintained in frictional engagement with said washer and said washer is maintained in frictional engagement with said collar; a tool-supporting driven member coaxial with said spindle and rotatably mounted in said casing, said driven member adjacent to said driving member and having a portion projecting from said casing; second coupling means comprising at least one coupling element on said driving member and at least one complementary coupling element on said driven member; and resilient means provided in said casing for permanently biasing said driving member into a coupling position in which said coupling elements are in engagement with each other and said driven member rotates with said driving member, the arrangement being such that said coupling elements are disengaged from each other by longitudinal movement of said driving member with respect to said spindle in response to a predetermined resistance offered by said driven member to rotation with said driving member, and that said coupling elements reengage each other under the bias of said resilient means to impart a sudden rotary impulse to said driven member.

4. A portable torque and impulse transmitting apparatus comprising, in combination, housing means comprising handgrip means; electric motor means mounted in said housing means; a casing connected with said housing means; a rotary spindle mounted in said casing; transmission means for drivingly connecting said motor means with said spindle; an annular driving member received in said casing and coaxially surrounding said spindle, said driving member having a cylindrical extension defining a bore and formed with an externally threaded portion, and an annular collar; first coupling means longitudinally movably connecting said driving member for rotation with said spindle; an annular flywheel mass coaxially surrounding said extension and having two end faces one of which is adjacent to said collar; a friction producing washer disposed between said one end face and said collar; a dished spring surrounding said extension and disposed adjacent to the other end face of said flywheel mass; an adjusting nut meshing with said externally threaded portion and engaging with said spring for biasing said flywheel mass into frictional engagement with said washer and for simultaneously biasing said washer into frictional engagement with said collar; a tool-supporting driven member coaxial with said spindle and rotatably mounted in said casing, said driven member adjacent to said driving member and having a portion projecting from said casing; second coupling means comprising at least one coupling element on said driving member and at least one complementary coupling element on said driven member; a bearing plate fixedly received in said casing, said plate rotatably supporting said spindle and having a portion extending into the bore of said extension; and a helical spring received in said bore and operating between said bearing plate and said driving member for permanently biasing said driving member into a coupling position in which said coupling elements are in engagement with each other and said driven member rotates with said driving member, the arrangement being such that said coupling elements are disengaged from each other by longitudinal movement of said driving member with respect to said spindle in response to a predetermined resistance offered by said driven member to rotation with said driving member, and that said coupling elements reengage each other under the bias of said helical spring to impart a sudden rotary impulse to said driven member.

5. A torque and impulse transmitting apparatus comprising, in combination, rotary spindle means; an annular driving member coaxially surrounding said spindle means; means longitudinally movably connecting said driving member for rotation with said spindle means; an annular flywheel mass coaxially surrounding said driving member; friction producing means for connecting said mass with said driving member so that the mass is adapted to rotate with and increases the inertia of said driving member, said friction producing means comprising washer means disposed between said mass and said driving member and spring means for biasing said mass against said washer means; a tool-supporting driven member coaxial with said spindle means; means comprising at least one coupling element on said driving member and at least one complementary coupling element on said driven member; and resilient means for permanently biasing said driving member into a coupling position in which said coupling elements are in engagement with each other and said driven member rotates with said driving member, the arrangement being such that said coupling elements are disengaged from each other by longitudinal movement of said driving member with respect to said spindle means in response to a predetermined resistance offered by said driven member to rotation with said driving member, and that said coupling elements reengage each other under the bias of said resilient means to impart a sudden rotary impulse to said driven member.

6. A torque and rotary impulse transmitting apparatus for use as a screwdriver and the like, said apparatus comprising, in combination, rotary spindle means; motor means for driving said spindle means; an annular driving member coaxial with said spindle means; means for axially shiftably connecting said driving member with said spindle means in such a way that the driving member lags behind the spindle means when shifted in a first axial direction; resilient means for permanently biasing said driving member in a second axial direction; an annular flywheel mass coaxial with said spindle means; friction producing means for releasably connecting said flywheel mass with said driving member so that said mass is adapted to rotate with the driving member; a driven member adjacent to said driving member and coaxial with said spindle means; and coupling means comprising at least one coupling element on said driving member and at least one complementary coupling element on said driven member for connecting said members when the driving member is shifted in said second direction, the arrangement being such that said coupling elements are disengaged from each other when said driving member is shifted in said first direction in response to a predetermined resistance offered by said driven member to rotation with said driving member, and that said coupling elements reengage each other under the bias of said resilient means to transmit a sudden rotary impulse to said driven member.

7. A torque and rotary impulse transmitting apparatus for use as a screwdriver and the like, said apparatus comprising, in combination, rotary spindle means; motor means for driving said spindle means; an annular driving member coaxial with said spindle means; means for axially shiftably connecting said driving member with said spindle means in such a way that the driving member lags behind the spindle means when shifted in a first axial direction; resilient means for permanently biasing said driving member in a second axial direction; an annular flywheel mass coaxial with said spindle means; adjustable friction producing means for connecting said flywheel mass with said driving member so that said mass is adapted to rotate with and increases the inertia of said driving member; a driven member adjacent to said driving member and coaxial with said spindle means; and coupling means comprising at least one coupling element on said driving means and at least one complementary coupling element on said driven member for connecting said members when the driving member is shifted in said second direction, the arrangement being such that said coupling elements are disengaged from each other when said driving member is shifted in said first direction in response to a predetermined resistance offered by said driven member to rotation with said driving member, and that said coupling elements reengage each other under the bias of said resilient means to transmit a sudden rotary impulse to said driven member.

8. A torque and rotary impulse transmitting apparatus for use as a screwdriver and the like, said apparatus comprising, in combination, rotary spindle means; motor means for driving said spindle means; an annular driving member coaxial with said spindle means, said driving member comprising a coaxial extension and an annular collar; means for axially shiftably connecting said driving member with said spindle means in such a way that the driving member lags behind the spindle means when shifted in a first axial direction; resilient means for permanently biasing said driving member in a second axial direction; an annular flywheel mass coaxially surrounding said extension; friction producing means for biasing said flywheel mass toward said extension so that said mass is rotatable with and increases the inertia of said driving member; a driven member adjacent to said driving member and coaxial with said spindle means; and coupling means comprising at least one coupling element on said driving member and at least one complementary coupling element on said driven member for connecting said members when the driving member is shifted in said second direction, the arrangement being such that said coupling elements are disengaged from each other when said driving member is shifted in said first direction in response to a predetermined resistance offered by said driven member to rotation with said driving member, and that said coupling elements reengage each other under the bias of said resilient means to transmit a sudden rotary impulse to said driven member.

9. A torque and rotary impulse transmitting apparatus for use as a screwdriver and the like, said apparatus comprising, in combination, rotary spindle means; motor means for driving said spindle means; an annular driving member coaxial with said spindle means, said driving member comprising a coaxial extension and an annular collar; means for axially shiftably connecting said driving member with said spindle means in such a way that the driving member lags behind the spindle means when shifted in a first axial direction; resilient means for permanently biasing said driving member in a second axial direction; an annular flywheel mass coaxially surrounding said extension; friction producing means including spring means for biasing said flywheel mass toward said extension so that said mass is rotatable with and increases the inertia of said driving member; means for adjusting the bias of said spring means; a driven member adjacent to said driving member and coaxial with said spindle means; and coupling means comprising at least one coupling element on said driving member and at least one complementary coupling element on said driven member for connecting said members when the driving member is shifted in said second direction, the arrangement being such that said coupling elements are disengaged from each other when said driving member is shifted in said first direction in response to a predetermined resistance offered by said driven member to rotation with said driving member, and that said coupling elements reengage each other under the bias of said resilient means to transmit a sudden rotary impulse to said driven member.

10. A torque and rotary impulse transmitting apparatus for use as a screwdriver and the like, said apparatus comprising, in combination, rotary spindle means; motor means for driving said spindle means; an annular driving member coaxial with said spindle means, said driving member comprising a coaxial extension and an annular collar; means for axially shiftably connecting said driving member with said spindle means in such a way that the driving member lags behind the spindle means when shifted in a first axial direction; resilient means for permanently biasing said driving member in a second axial direction; an annular flywheel mass coaxially surrounding said extension; friction producing means for biasing said flywheel mass toward said extension so that said mass is rotatable with and increases the inertia of said driving member, said friction producing means comprising a washer of synthetic plastic material disposed between said collar and said flywheel mass, a spring for permanently biasing said flywheel mass against said washer, and means for adjusting the bias of said spring; a driven member adjacent to said driving member and coaxial with said spindle means; and coupling means comprising at least one coupling element on said driving member and at least one complementary coupling element on said driven member for connecting said members when the driving member is shifted in said second direction, the arrangement being such that said coupling elements are disengaged from each other when said driving member is shifted in said first direction in response to a predetermined resistance offered by said driven member to rotation with said driving member, and that said coupling elements reengage each other under the bias of said resilient means to transmit a sudden rotary impulse to said driven member.

11. A torque and rotary impulse transmitting apparatus for use as a screwdriver and the like, said apparatus comprising, in combination, rotary spindle means; motor means for driving said spindle means; and annular driving member coaxial with said spindle means; means for axially shiftably connecting said driving member with said spindle means in such a way that the driving member lags behind the spindle means when shifted in a first axial direction; resilient means for permanently biasing said driving member in a second axial direction; an annular flywheel mass coaxial with said spindle means; friction producing means for releasably connecting said flywheel mass with said driving member so that said mass is adapted to rotate with the driving member, the moment of inertia of said driving member approximating the moment of inertia of said flywheel mass; a driven member adjacent to said driving member and coaxial with said spindle means; and coupling means comprising at least one coupling element on said driving member and at least one complementary coupling element on said driven member for connecting said members when the driving member is shifted in said second direction, the arrangement being such that said coupling elements are disengaged from each other when said driving member is shifted in said first direction in response to a predetermined resistance offered by said driven member to rotation with said driving member, and that said coupling elements reengage each other under the bias of said resilient means to transmit a sudden rotary impulse to said driven member.

12. A torque and rotary impulse transmitting apparatus for use as a screwdriver and the like, said apparatus comprising, in combination, rotary spindle means; motor means for driving said spindle means; an annular driving member coaxial with said spindle means; means for axially shiftably connecting said driving member with said spindle means in such a way that the driving member lags behind the spindle means when shifted in a first axial direction; resilient means for permanently biasing said driving member in a second axial direction; an annular flywheel mass coaxial with said spindle means; friction producing means for releasably connecting said flywheel mass with said driving member so that said mass is adapted to rotate with the driving member, the moment of inertia of said flywheel mass greater than the moment of inertia of said driving member; a driven member adjacent to said driving member and coaxial with said spindle means; and coupling means comprising at least one coupling element on said driving member and at least one complementary coupling element on said driven member for connecting said members when the driving member is shifted in said second direction, the arrangement being such that said coupling elements are disengaged from each other when said driving member is shifted in said first direction in response to a predetermined resistance offered by said driven member to rotation with said driving member, and that said coupling elements reengage each other under the bias of said resilient means to transmit a sudden rotary impulse to said driven member.

References Cited in the file of this patent

UNITED STATES PATENTS

| | | |
|---|---|---|
| 2,539,678 | Thomas | Jan. 30, 1951 |
| 2,712,254 | Schodeberg | July 5, 1955 |
| 2,717,672 | Maurer | Sept. 13, 1955 |
| 2,745,528 | Amtsberg | May 15, 1956 |
| 2,792,732 | Brucker | May 21, 1957 |
| 2,808,916 | Johnson | Oct. 8, 1957 |
| 2,907,239 | Schwenk | Oct. 6, 1959 |
| 2,907,240 | Schwenk | Oct. 6, 1959 |
| 2,940,565 | Schodeberg | June 14, 1960 |